United States Patent
Kranz et al.

(10) Patent No.: US 11,177,679 B2
(45) Date of Patent: Nov. 16, 2021

(54) WIRELESS CHARGEABLE DEVICE, AN APPARATUS FOR CONTROLLING WIRELESS CHARGING OF A WIRELESS CHARGEABLE DEVICE AND METHOD FOR CONTROLLING WIRELESS CHARGING OF A WIRELESS CHARGEABLE DEVICE

(71) Applicant: Intel IP Corporation, Santa Clara, CA (US)

(72) Inventors: Christian Kranz, Ratingen (DE); Markus Hammes, Dinslaken (DE); Christoph Schultz, Essen (DE)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 15/437,621

(22) Filed: Feb. 21, 2017

(65) Prior Publication Data

US 2017/0288448 A1    Oct. 5, 2017

(30) Foreign Application Priority Data

Apr. 1, 2016 (EP) .................................... 16163570

(51) Int. Cl.
*H02J 7/02* (2016.01)
*H02J 50/12* (2016.01)
*H04B 5/00* (2006.01)

(52) U.S. Cl.
CPC .............. *H02J 7/025* (2013.01); *H02J 50/12* (2016.02); *H04B 5/0037* (2013.01)

(58) Field of Classification Search
CPC ... H02J 7/025; H02J 7/02; H02J 50/12; H04B 5/0037

USPC .......................................................... 320/108
See application file for complete search history.

(56) References Cited

U.S. PATENT DOCUMENTS

| | | | |
|---|---|---|---|
| 9,178,369 B2* | 11/2015 | Partovi | H02J 50/90 |
| 2009/0240625 A1* | 9/2009 | Faith | G06K 19/07722 |
| | | | 705/65 |
| 2010/0244577 A1* | 9/2010 | Shimokawa | B60L 53/39 |
| | | | 307/104 |
| 2011/0050531 A1* | 3/2011 | Yamaguchi | H01Q 7/00 |
| | | | 343/842 |
| 2012/0112552 A1* | 5/2012 | Baarman | H01F 38/14 |
| | | | 307/104 |
| 2012/0112553 A1 | 5/2012 | Stoner, Jr. et al. | |
| 2014/0070764 A1* | 3/2014 | Keeling | H02J 50/40 |
| | | | 320/108 |
| 2014/0152117 A1* | 6/2014 | Sankar | H04B 5/0037 |
| | | | 307/104 |
| 2014/0325830 A1* | 11/2014 | Hatanaka | H02J 50/70 |
| | | | 29/602.1 |

(Continued)

Primary Examiner — Richard Isla
Assistant Examiner — Dung V Bui
(74) Attorney, Agent, or Firm — 2SPL Patent Attorneys PartG mbB; Kieran O'Leary

(57) ABSTRACT

The present disclosure relates to a wireless-chargeable device and an apparatus for controlling a magnetic field strength of a magnetic field generated by an electromagnet. The wireless-chargeable device includes an electromagnet (102) and a control circuit (104). The control circuit (104) is configured to control a magnetic field strength generated by an electro-magnet for alignment of a power-receiving coil (106) of the wireless-chargeable device with respect to a power-transmitting coil of a wireless power supply device.

21 Claims, 12 Drawing Sheets

(56) References Cited

U.S. PATENT DOCUMENTS

| | | | |
|---|---|---|---|
| 2015/0061578 A1* | 3/2015 | Keeling | H02J 5/005 |
| | | | 320/108 |
| 2015/0214752 A1* | 7/2015 | Gluzman | H02J 50/40 |
| | | | 307/104 |
| 2016/0013667 A1* | 1/2016 | Hosotani | H02J 50/40 |
| | | | 307/104 |
| 2016/0059723 A1* | 3/2016 | Kim | B60L 53/38 |
| | | | 320/108 |
| 2016/0072306 A1* | 3/2016 | Tsuda | H02J 50/60 |
| | | | 307/104 |
| 2016/0094078 A1 | 3/2016 | Graham et al. | |

* cited by examiner

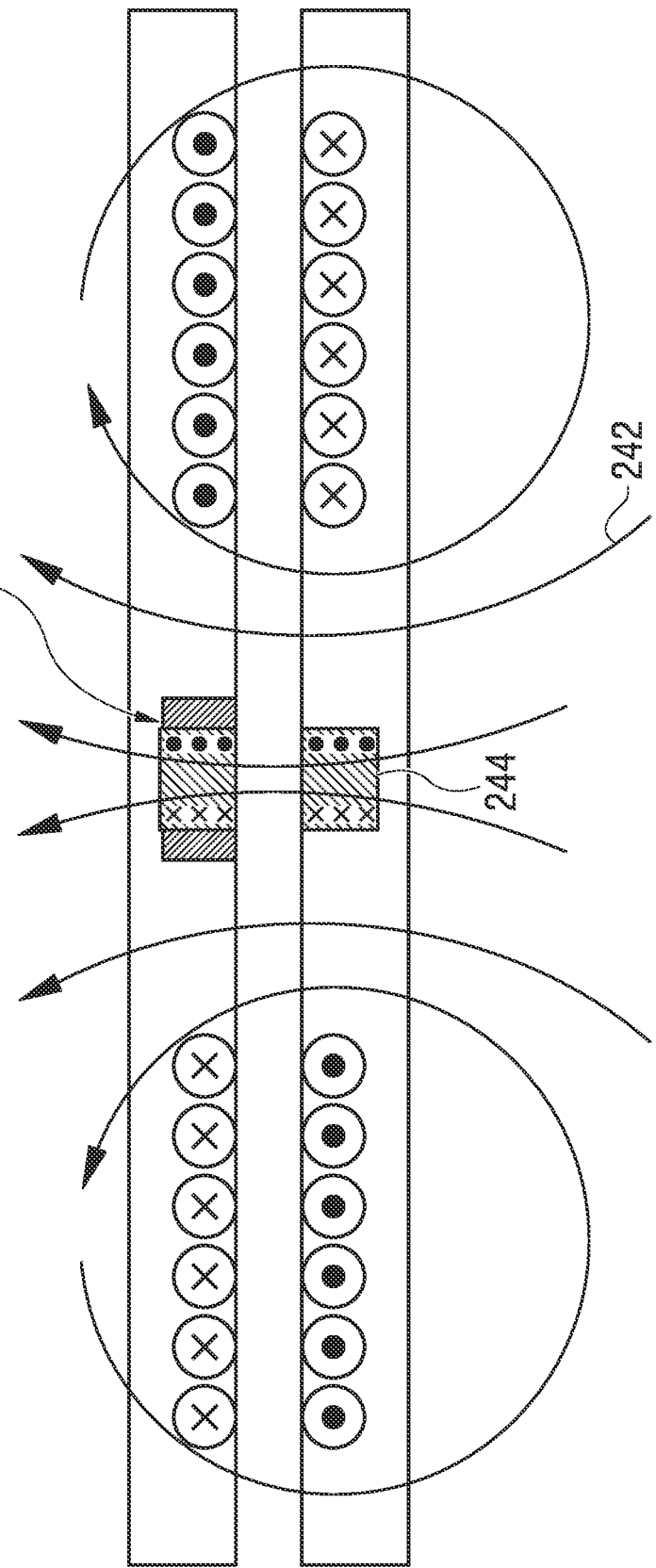

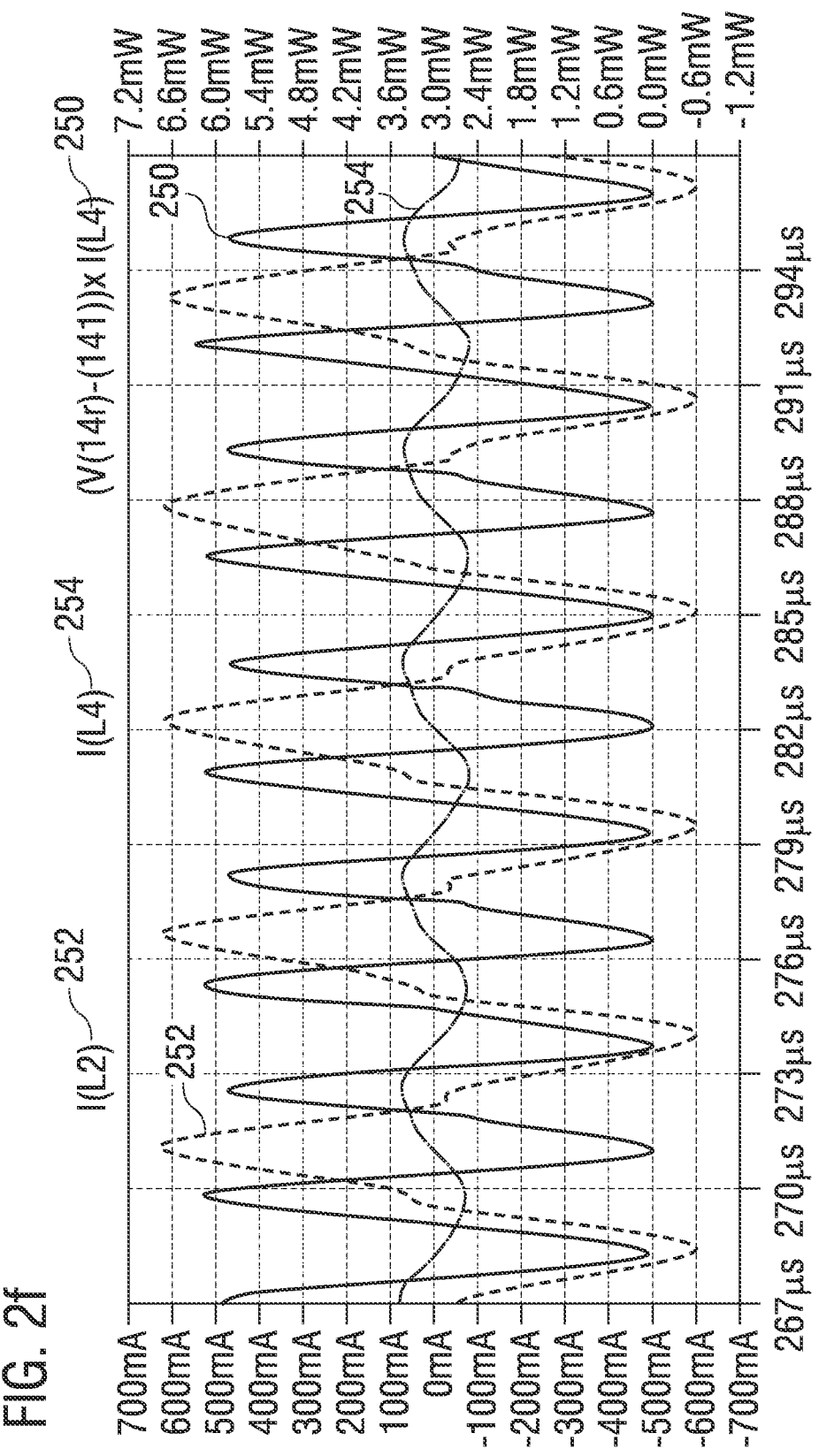

WIRELESS CHARGEABLE DEVICE, AN APPARATUS FOR CONTROLLING WIRELESS CHARGING OF A WIRELESS CHARGEABLE DEVICE AND METHOD FOR CONTROLLING WIRELESS CHARGING OF A WIRELESS CHARGEABLE DEVICE

TECHNICAL FIELD

The present disclosure relates to wireless-charging of electronic devices and in particular to a wireless chargeable device, an apparatus for controlling wireless charging of a wireless-chargeable device and method for controlling wireless charging of a wireless chargeable device

BACKGROUND

Wireless charging, e.g. for mobile devices such as smartphones or smartwatches, is adopted by a broad range of manufacturers and designers. For users of such devices, it enables a convenient usage of wireless power supply devices, which can be seamlessly integrated into furniture, and which, in many cases, do not require manually connecting the wireless-chargeable device and the power supply device. Using wireless charging also enables device manufacturers to omit space-consuming dedicated charging ports and facilitates a water-proofing of mobile devices, for example.

BRIEF DESCRIPTION OF THE FIGURES

Some examples of apparatuses and/or methods will be described in the following by way of example only, and with reference to the accompanying figures, in which

FIG. 2e illustrates eddy currents being generated in a ferrite core of an electromagnet during wireless charging;

FIG. 2f shows a diagram of currents and losses due to eddy currents in a wireless charging system;

DETAILED DESCRIPTION

Figure 1:
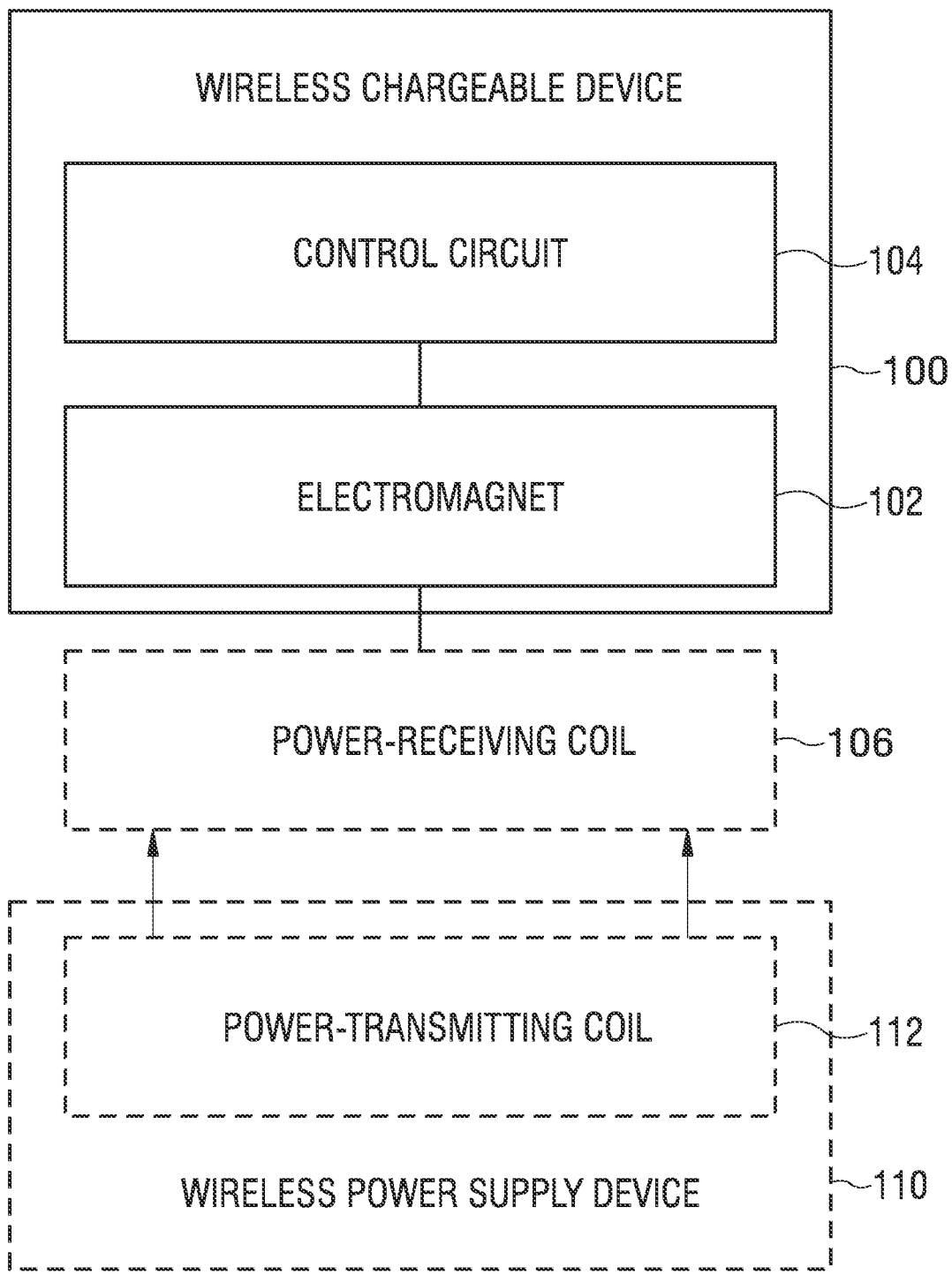
FIG. 1 shows a block diagram of a wireless-chargeable device comprising an electromagnet and a control circuit.

Various examples will now be described more fully with reference to the accompanying drawings in which some examples are illustrated. In the figures, the thicknesses of lines, layers and/or regions may be exaggerated for clarity.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or component signals, but do not preclude the presence or addition of one or more other features, integers, steps, operations, elements, component signals and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Wireless charging of wireless chargeable devices often requires a proper alignment of the transmitter and receiver coils. For the Qi and PMA (Power Matters Alliance) wireless charging standards, the specification mandates an alignment offset to be smaller than 2 mm for a sufficient power transfer. The alignment should provide an easy user experience. Therefore, alignment aids may improve a user experience in both Qi and PMA wireless charging applications. To achieve an adequate alignment, a number of different mechanisms may be used, such as audio, visual and mechanical feedback.

One approach may be to use magnetic attraction. For example, a permanent magnet may be placed in the center of the transmitter coil and a similar magnet or metal plate may be placed in the center of the receiver coil. Using a permanent magnet inside the receiver coil of mobile devices (for example smartphones) may damage magnetic stripes (for example on credit cards) due to the strong magnetic fields of the permanent magnet, for example.

Therefore, in conventional systems, mobile devices may use a non-magnetic metal plate in the center of the receiver coil. This may have a low magnetic attraction between transmitter and receiver. Therefore, the alignment of the two coils may be unprecise and difficult to achieve.

In practice, this may lead to a degraded user experience, because placing the phone on the charging pad might not reliably enable charging and may require alignment corrections performed by the user, e.g. by moving the phone around.

Examples may use an electromagnet instead of just a metal plate in the RX-Coil (power-receiving coil) of a wireless chargeable device. This electromagnet may be deactivated outside an alignment phase, but activated, if a power supply device with a power transmitter is detected. If switched on, it may support the alignment of the wireless power coils. The electromagnet may be switched off after the alignment is completed. To improve the alignment (or centering), the electromagnet may also be switched on if the power link deteriorates.

FIG. 1 shows a block diagram of a wireless-chargeable device 100 according to an example. The wireless-chargeable device 100 comprises an electromagnet 102 and a control circuit 104. The control circuit 104 is configured to control a magnetic field strength generated by the electromagnet for alignment of a power-receiving coil 106 of the wireless-chargeable device with respect to a power-transmitting coil of a wireless power supply device.

Controlling the magnetic field strength may enable aligning or aiding alignment of the wireless-chargeable device 100 and the wireless power supply device 110 by using magnetic attraction, while avoiding or reducing possible damage to external devices or materials.

The control circuit 104 is configured to control a magnetic field strength generated by an electromagnet for alignment of a power-receiving coil 106 of the wireless-chargeable device with respect to a power-transmitting coil 112 of a wireless power supply device 110. The control circuit 104 may be configured to activate the electromagnet 102 or to increase a magnetic field strength to aid the alignment of the power-receiving coil 106 with respect to the power-transmitting coil 112. The control circuit 104 may be configured to deactivate the electromagnet 102 or decrease the magnetic field strength to cease aiding the alignment. The control circuit 104 may be configured to provide a control signal to control a power supply of the power-receiving coil 106, or the control circuit 104 may be configured to provide a current and/or voltage to the power-receiving coil 106 to control the magnetic field strength. Controlling the magnetic field strength may comprise activating the electromagnet 102, activating the magnetic field, increasing the magnetic field strength, maintaining the magnetic field strength, decreasing the magnetic field strength, deactivating the magnetic field, or deactivating the electromagnet, for example.

The wireless-chargeable device 100 may e.g. correspond to a mobile device having wireless charging capabilities, such as e.g. a mobile phone, a cellular phone, a smartwatch, a mobile entertainment device, a mobile audio player, a mobile video player, a mobile computer, a sports tracking device, a mobile loudspeaker, a kitchen device, or an electric shaver. The electromagnet comprises a coil and a ferromagnetic core, for example. The ferromagnetic core does not emit a static magnetic field or form a permanent magnet, for example. The ferromagnetic core may e.g. comprise at least one element of the group of iron, cobalt and nickel, or alloys thereof. The coil may e.g. correspond to a solenoid, which comprises a single or multiple layers of insulated wire.

The wireless power supply device 110 may correspond to a wireless charging station, which may be standalone or integrated within another device or furniture. The power-transmitting coil may correspond to one or more coils used to transmit power wirelessly to the power-receiving coil 106. The power-transmitting coil may correspond to an array of coils, for example. Coils of the array of coils may overlap, for example. For example, coils of the array of coils may have a hexagonal shape or another shape, for example. The power-transmitting coil 112 may correspond to a primary coil of an array of coils, for example.

The control circuit 104 may be implemented using one or more processing units, one or more processing devices, any means for processing, such as a processor (e.g. a general purpose processor, a Digital Signal Processor (DSP), a micro-controller) or a programmable hardware component being operable with accordingly adapted software. For example, the described function of the control circuit 104 may be implemented in software, which is then executed on one or more programmable hardware components.

The power-receiving coil 106 may have an outer diameter varying between 25 mm and 45 mm and an inner diameter varying between 10 mm and 20 mm. The power-receiving coil 106 may have a resonance frequency between 5 MHz and 30 MHz, e.g. 5 MHz, 8 MHz, 10 MHz, 12.5 MHz, 15 MHz, 17.5 MHz, 22 MHz, 25 MHz or 30 MHz. The wireless-chargeable device 100 comprises the power-receiving coil, for example. An inner diameter of the coil of the electromagnet 102 may measure between 5 mm and 15 mm, for example. An outer diameter of the coil of the electromagnet 102 may measure between 10 mm and 25 mm, for example. The coil of the electromagnet 102 may be located within the void delimited by an inner diameter of the power-receiving coil 106, for example. The power-receiving coil 106 and the coil of the electromagnet 102 may be arranged concentrically. For example, a center or midpoint of the power-receiving coil 106 may be substantially equal to a center or midpoint of the coil of the electromagnet 102. (e.g. a distance between the centers of the coils may be less than 3 mm or less than 1 mm).

Figure 2A:
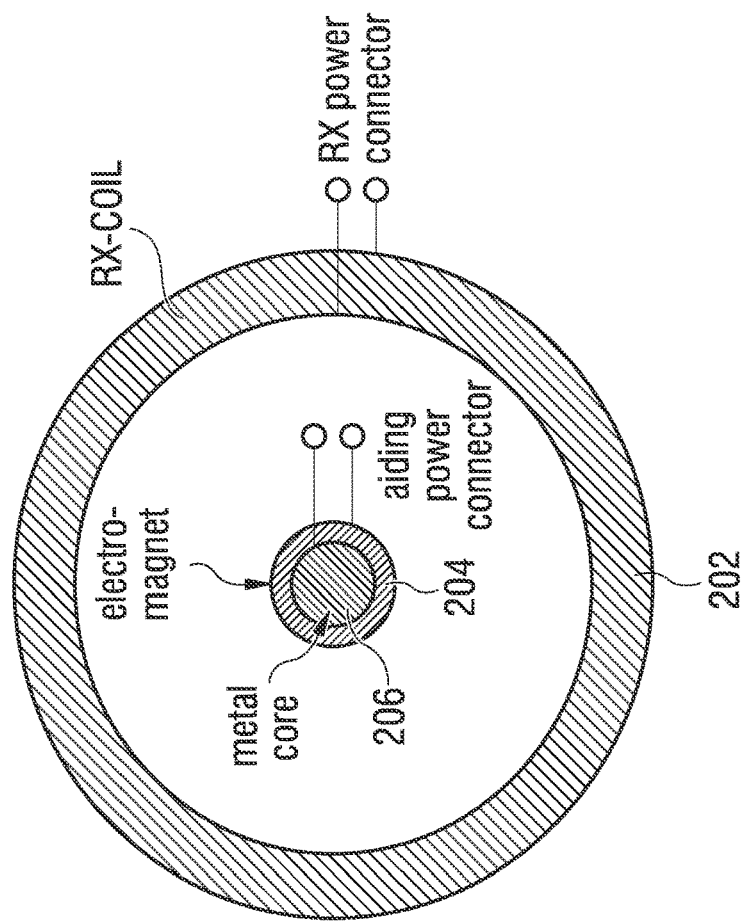
FIG. 2a shows a top view of a power-transmitting coil of a wireless power supply device and a power-receiving coil of a wireless-chargeable device having an electromagnet.
Figure 2A:
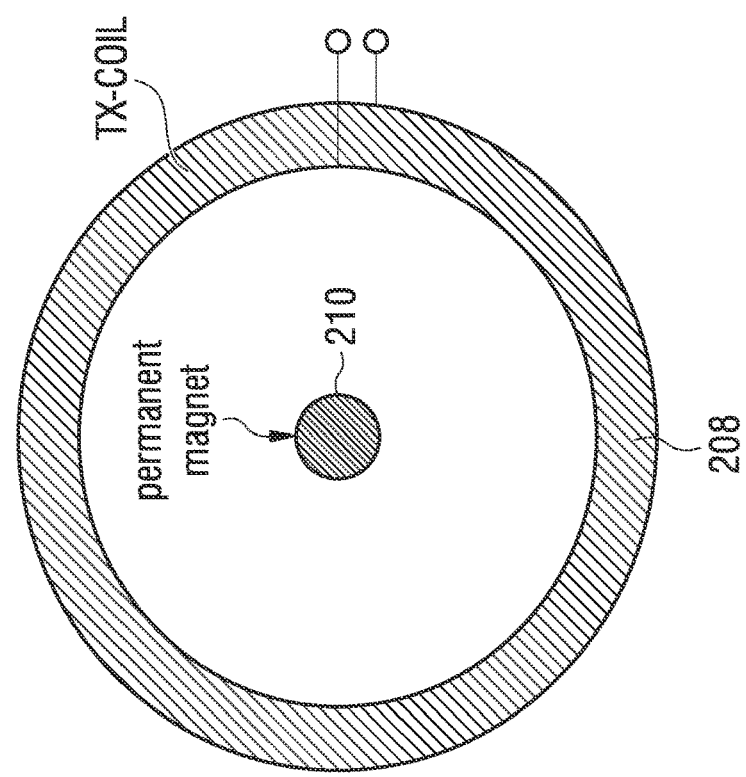
Figure 3:
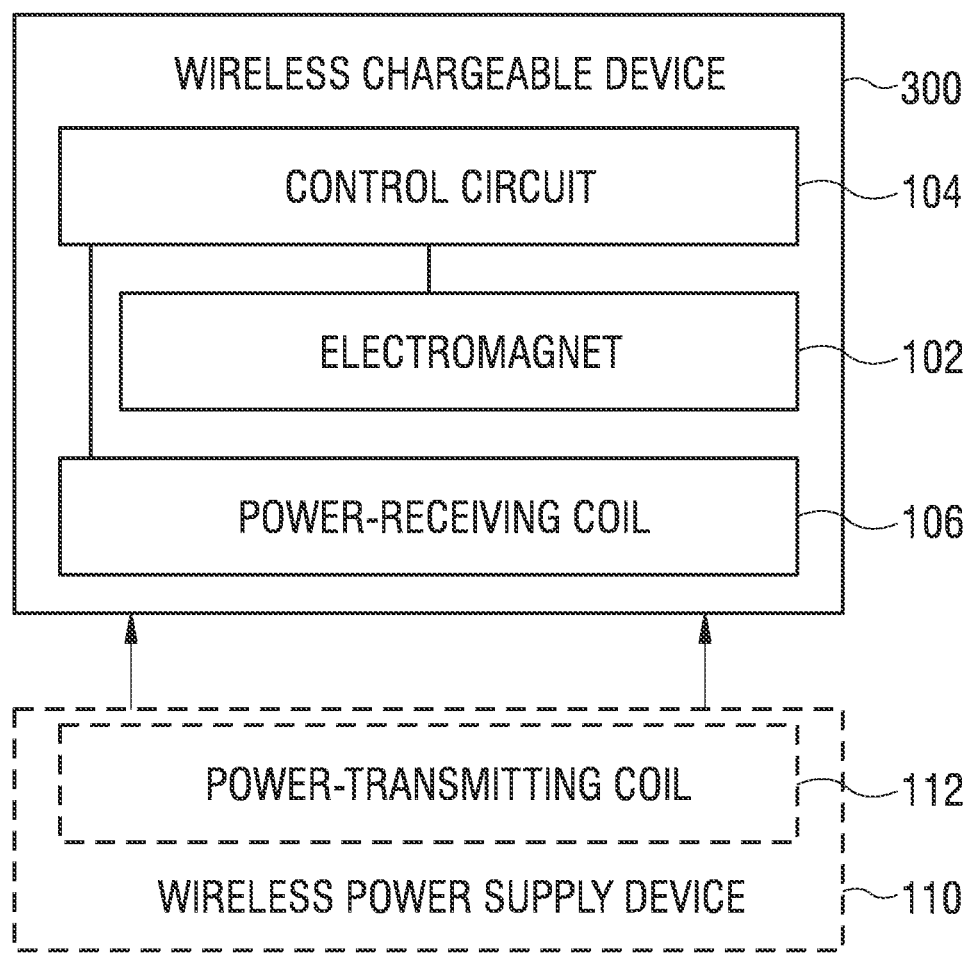
FIG. 3 shows a block diagram of a wireless-chargeable device comprising an electromagnet, a control circuit and a power-receiving coil.
Figure 4:
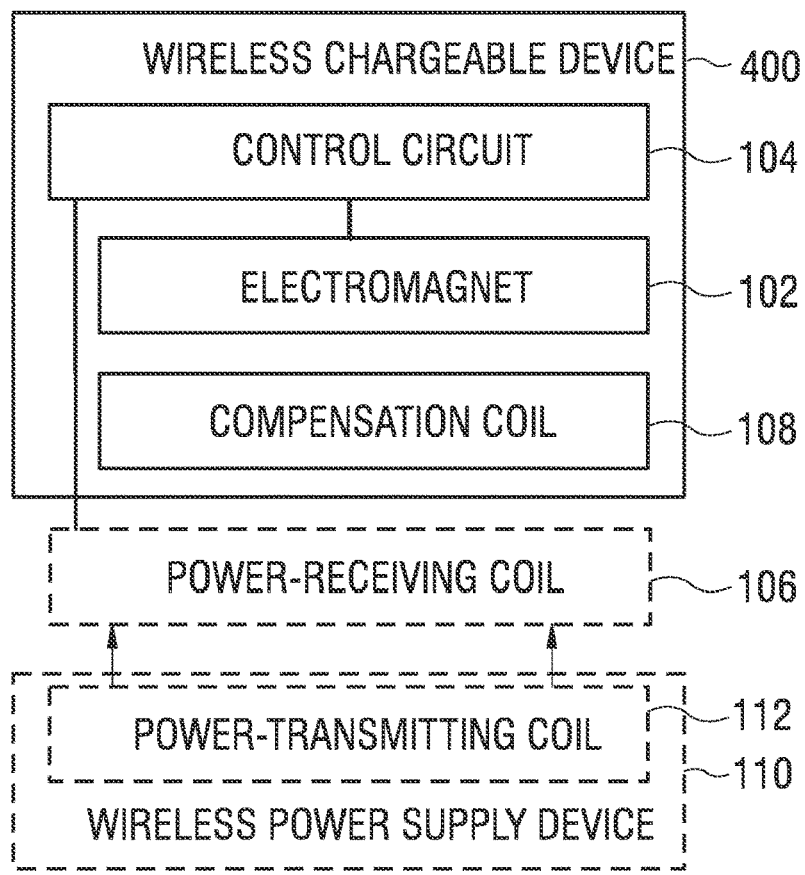
FIG. 4 shows a block diagram of a wireless-chargeable device comprising an electromagnet, a control circuit and a compensation coil.

FIG. 2a depicts a diagram of an exemplary wireless-chargeable device 212, e.g. a wireless-chargeable device as shown in FIG. 1, 3 or 4 having a power-receiving (RX) coil 202 with an electromagnet 204 with a ferromagnetic core 206 in the center. FIG. 2a further depicts a common power-transmitting (TX) coil 208 of a wireless power supply device 214 having a permanent magnet 210.

Figure 2B:
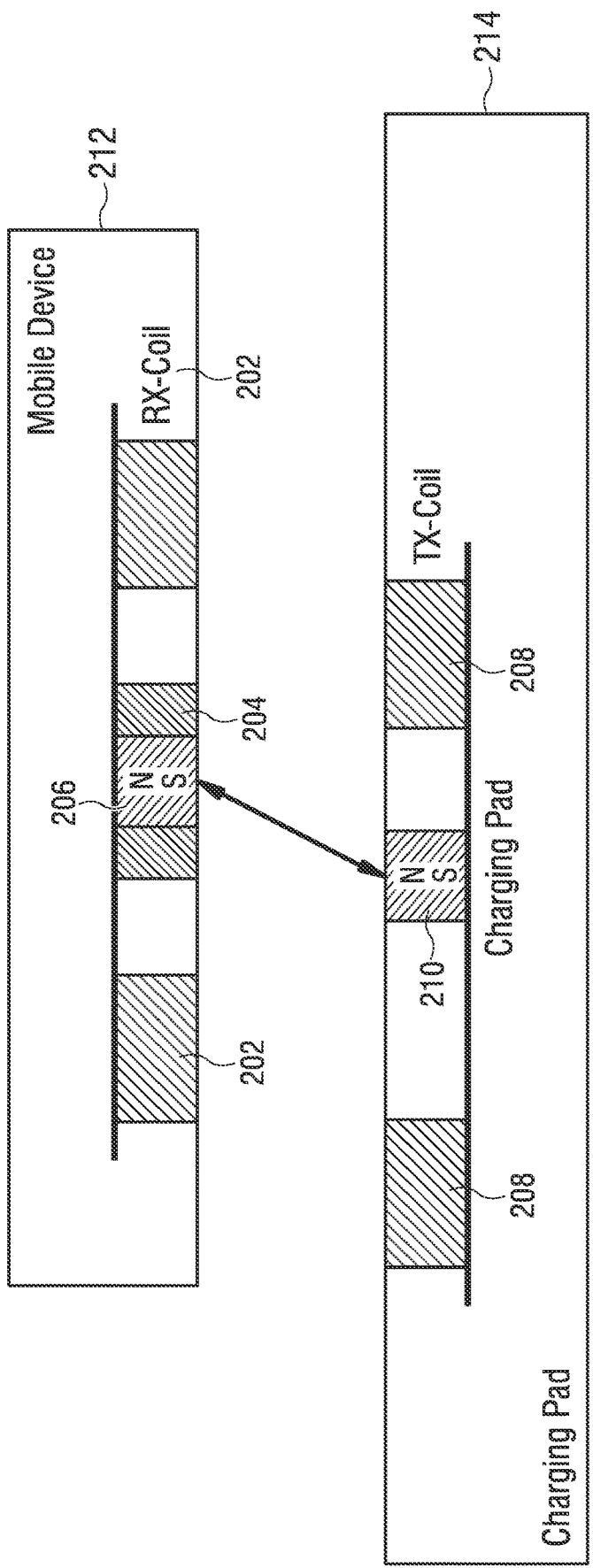
FIG. 2b shows a side view of a power-transmitting coil of a wireless power supply device and a power-receiving coil of a wireless-chargeable device having an electromagnet.

During normal operation of the wireless chargeable device, the electromagnet 204 may be switched off, e.g. no power is provided to it. If the wireless-chargeable device 212 detects that it is close to a transmitter 214 (or a TX-Coil thereof), the electromagnet 204 may be powered and a magnetic field may be activated or intensified, which may generate a strong force between the two magnets 204; 210 (e.g. shown in FIG. 2b) and may aid the mobile device to align the RX-Coil 202 to the TX-coil 208 of the charging pad of the wireless power supply device 214.

Because of the higher magnetic attraction, the precision of the alignment aid may be higher and the user experience improved. In some examples, the mobile device might not have to be adjusted multiple times on the charging pad until a good power connection is established. The two coils may be aligned when the phone is put on the charging pad. As the electromagnet 204 might only be switched on during alignment, there may be no risk from a magnetic field otherwise.

The control circuit 104 may be configured to detect a presence of the wireless power supply device 110 in proximity of the wireless-chargeable device 110. Detecting the presence of the wireless power supply device 110 may enable a targeted activation or adjustment of the magnetic field strength when a charging operation is imminent. For detecting a presence of the wireless power supply device 110, different options may be feasible (e.g. depending on the used wireless charging standard). The control circuit 104 may be configured to monitor at least one electrical parameter of the power-receiving coil, and may detect the presence of the wireless power supply device 110 based on the monitored at least one electrical parameter. Monitoring the at least one electrical parameter may in some examples enable detecting the presence of the wireless power supply device 110, e.g. through detection of the influence of the wireless power supply device 110 on the power-receiving coil.

Figure 2C:
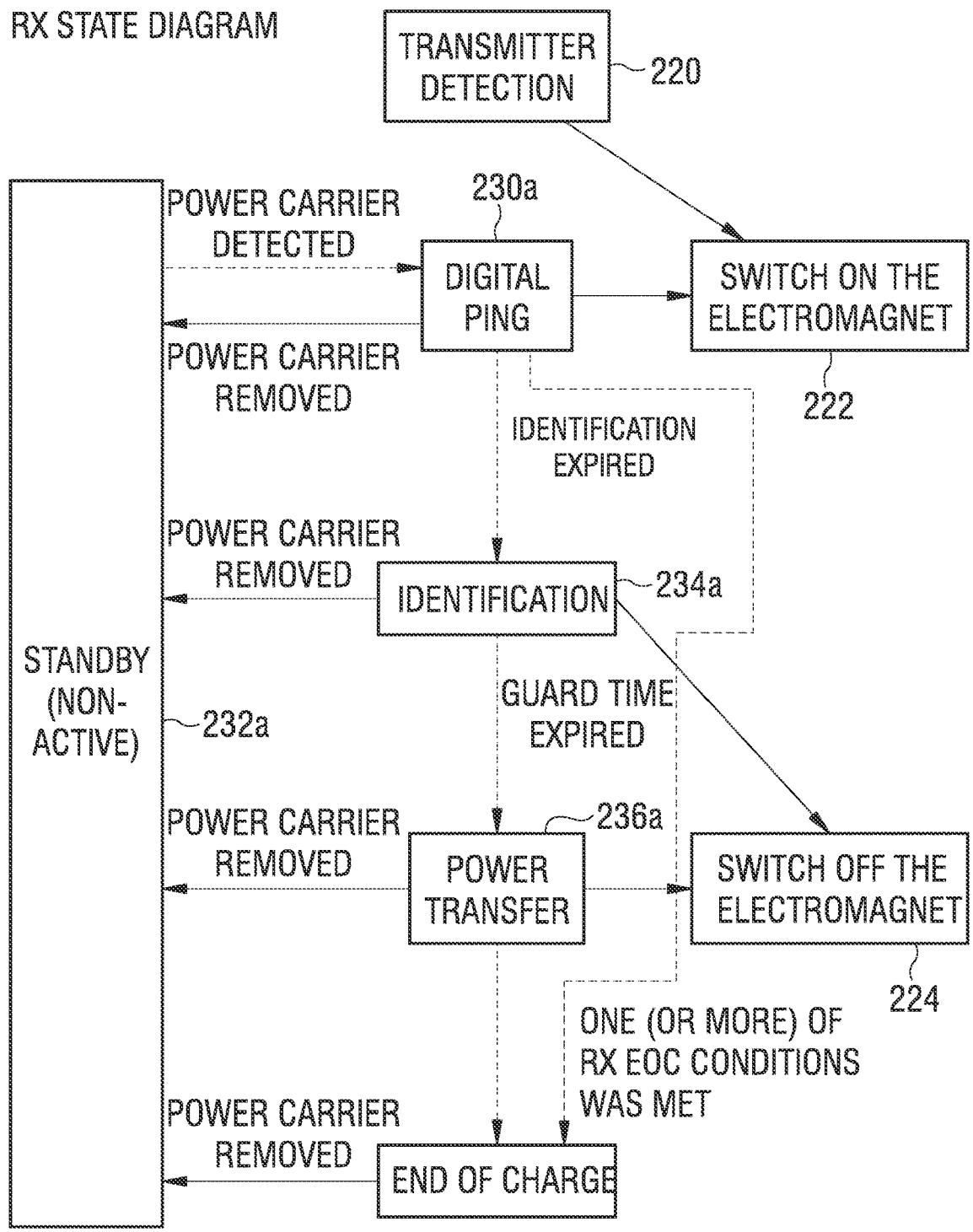
FIG. 2c shows a state transition diagram for a wireless-chargeable device.
Figure 2D:
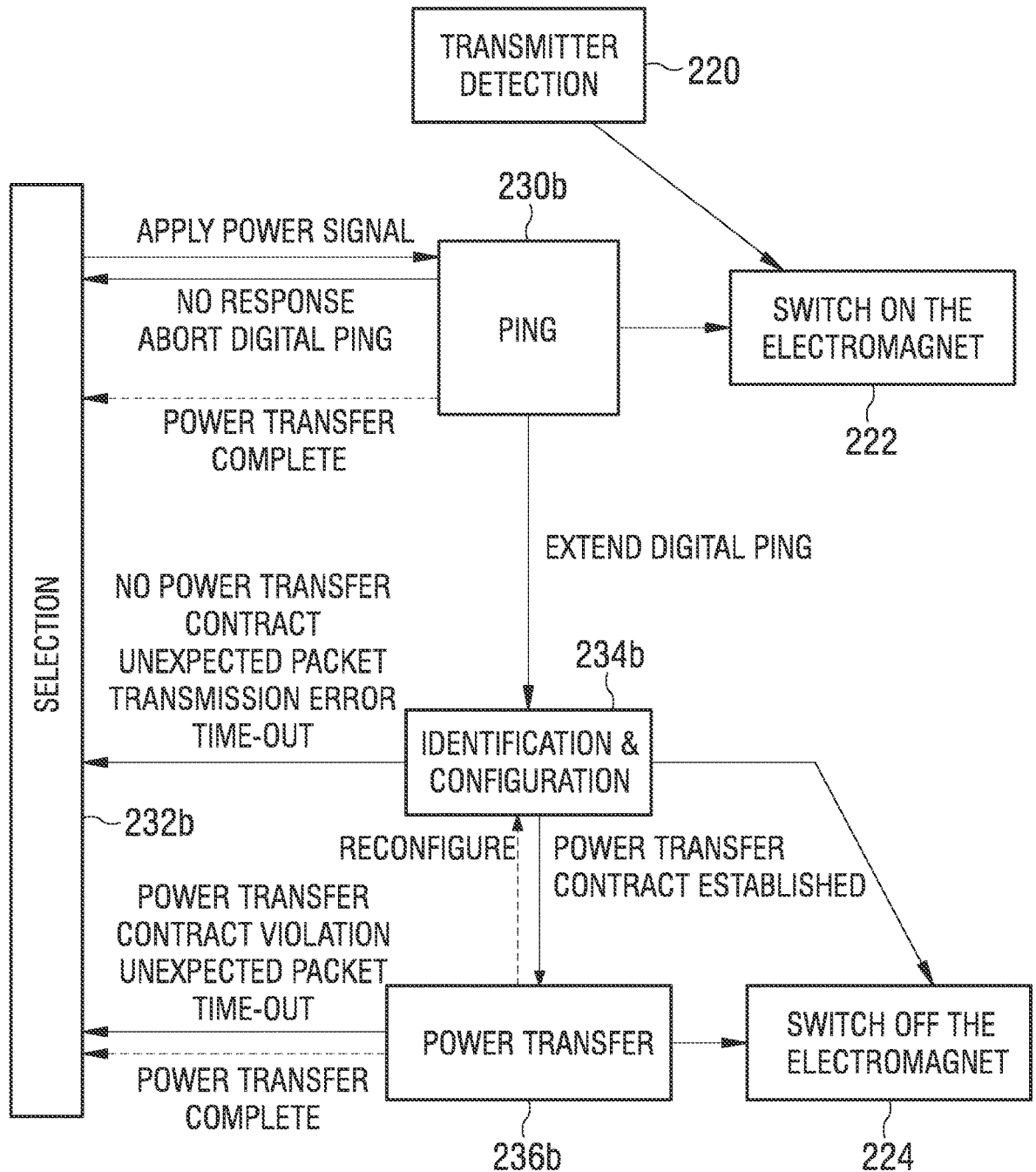
FIG. 2d shows a state transition diagram for a wireless charging system.

The detection may be performed at various states of the wireless power transfer. FIGS. 2c and 2d illustrate extended state diagrams of wireless charging standards. In FIG. 2c, the state transition diagram for a wireless-chargeable device, e.g. the wireless-chargeable device 100, comprises a digital ping state (a discovery state) 230a, in which the wireless-chargeable device is configured to receive a ping from a wireless power-supply device. The ping state 230a may change to a standby state 232a, e.g. when a power carrier (e.g. the wireless power supply device 110) is removed, to an identification state 234a, in which the wireless power transfer is being configured, or to an end of charge state 238, in which the power transfer ceases or has ceased, e.g. if one or more end of charge conditions of the wireless-chargeable device are met. The identification state 234a may change to the standby state 232a if the power carrier is removed, or to a power transfer state 236a, when a guard time has expired. The power transfer state 236a may change to the standby state 232a if the power carrier is removed, or to the end of charge state 238. In FIG. 2d illustrates a state transition diagram for both transmitter and receiver.

FIG. 2d shows a ping state 230b. In the ping state, the wireless-chargeable device may be configured to receive a ping from the wireless power supply device, and respond to the ping signal. If no response is transmitted or the power transfer is complete, the ping state may change to a selection state 232b. The selection state 232b may change to the ping state if a power signal is applied. If a response is transmitted, an identification & configuration state 234b is entered, for example. If no configuration (Power Transfer Contract) can be established or an unexpected Packet transmission error or a timeout occurs, the identification & configuration state may change to the selection state 232b. If a power transfer contract is established, the identification & configuration state 234b may change to the power transfer state 236b. If the power transfer contract is violated, an unexpected packet is received, a timeout occurs and/or the power transfer is complete. Then the power transfer 236b may change to the selection state 232b. The power transfer state 236b may additionally or alternatively return to the identification & configuration state 234b to reconfigure.

The detection may already be done before the transmitter starts with the ping procedure, for example. A detection method 220, as shown in FIGS. 2c; 2d may be implemented in the wireless chargeable device 100, for example. The control circuit 104 may be configured to perform the detection, e.g. a passive detection based on the Hall Effect, or based on inductance measurements of the power-receiving coil. Alternatively or additionally, the control circuit 104 may be configured to perform an active detection, for example based on monitoring or detecting a shift in the power-receiving coil 106 resonance frequency due to the presence of other magnetic objects on the interface surface (e.g. surface of the wireless power supply device).

Alternatively or additionally, the control circuit 104 may be configured to detect a ping signal emitted by the wireless power supply device 110, and detect the presence based on the detected ping signal, for example. The ping signal may correspond to a ping signal or initial power transfer as defined by the Qi or PMA standard, for example. For example, in wireless charging, a ping is a short burst of power transmitted by the transmitter, and may serve as an indicator to the wireless chargeable device that a wireless power transmitter is nearby. Detecting the ping signal may further enable the detection of the presence of the wireless power supply device 110.

In case of fully discharged batteries, the power carried by the ping may be used to power the electromagnet 102. Alternatively, there might be no active aiding (if the battery of the wireless-chargeable device is completely empty). Nevertheless, a metal core of the electromagnet may support magnetic aiding, albeit having a lower magnetic force, for example.

The control circuit 104 may be configured to control the magnetic field strength based on the detected presence. The control circuit 104 may be configured to increase the magnetic field strength or to activate the electromagnet (e.g. reference sign 222 in FIG. 2c or 2d) based on the detected presence, for example, which may aid the alignment of the power-receiving coil 106 with respect to the power-transmitting coil 112, for example. Controlling the magnetic field strength based on the detected presence may enable using the electromagnet 102 to guide the alignment when the wireless power supply device 110 is detected in the proximity, and may avoid activating the electromagnet 102 when the wireless power supply device 110 is not in proximity of the wireless-chargeable device 100.

The control circuit 104 may be configured to determine information related to a power transmission between the wireless power supply device 110 and the wireless-chargeable device 100. The information related to the power transmission may relate to a quality of the power transmission, or to a state of the power transmission (e.g. whether the power transmission is being configured, power is transmitted, or the power transmission has ended) for example. The power transmission may correspond to a wireless power transfer between the power-transmitting coil 112 and the power-receiving coil 106. It may be based on induction at a specified resonance frequency. The control circuit 104 may be configured to control the magnetic field strength based on the information related to the power transmission. The control circuit 104 may be configured to monitor the power transmission between the wireless power supply device 110 and the wireless-chargeable device 100 to obtain the information related to the power transmission, for example, or the control circuit 104 may be configured to obtain the information related to the power transmission from another module, which may be internal or external to the wireless-chargeable device 100. The control circuit 104 may be configured to obtain the information related to the power transmission from the wireless power supply device 110, for example, e.g. using control information exchanged between the wireless-chargeable device 100 and the wireless power supply device. Using the information related to the power transmission may enable controlling the magnetic field strength based on a quality or state of the wireless power transfer.

The control circuit 104 may e.g. be configured to determine a quality of the power transmission based on the information related to the power transmission. The quality of the power transmission may be based on a usable power received by the power-receiving coil, a ratio of the power received by the power-receiving coil and an expected receive power, or a parasitic loss of the wireless power transfer. The control circuit 104 may be configured to control the magnetic field strength based on the quality of the power transmission. The quality of the power transmission may be represented using a numeric scale, for example. The control circuit 104 may be configured to increase the magnetic field strength or to activate the electromagnet 102 if the quality of the power transmission is below a lower threshold, for example. The quality being below the lower threshold may indicate that a compromise between alignment effort and efficiency of the wireless power transfer is violated, and may trigger a re-alignment of the power-receiving coil 106 with respect to the power-transmitting coil 112 via an increase of the magnetic field strength. The control circuit 104 may be configured to decrease the magnetic field strength or to deactivate the electromagnet 102 if the quality of the power transmission is above an upper threshold. The quality of the power transmission being above the upper threshold may indicate that the alignment is precise enough to enable a stable or efficient enough power transfer. Deactivating the electromagnet or decreasing the magnetic field strength based on the quality may lower a power consumption and decrease an influence of the electromagnet on surrounding devices and materials. Controlling the magnetic field strength based on the quality of the power transmission enables adjusting the alignment when the quality is not good enough for an efficient power transfer or not adjusting the alignment, when the quality is good enough, thus conserving energy and reducing emissions.

The control circuit 104 may be configured to detect a state of the power transmission based on the information related to the power transmission. The state of the power transmission may relate to a current activity, condition, situation or working of the power transmission. The state of the power transmission may e.g. correspond to a discovery state (ping state), an identification/configuration state, a power transfer state, and an end of charge/stopped power transmission state, e.g. similar to the states shown in FIG. 2c or 2d. The control circuit 104 may be configured to control the magnetic field strength based on the state of the power transmission, e.g. by switching on the electromagnet based on the ping state 230a; 230b or based on detecting the presence of the transmitter 220, or by switching off the electromagnet 224 based on the identification 234a or identification & configuration 245b or when a power transfer 236a; 236b has been initiated or completed. The established power connection may be used as a clear indication that the alignment of the power-transmitting coils and power-receiving coils is good enough. Controlling the magnetic field strength based on the state of the power transmission may enable performing an alignment prior to an actual power transmission.

The control circuit 104 may e.g. be configured to decrease the magnetic field strength, to deactivate the electromagnet 102 or to control the magnetic field strength to emit an inverted field to repel the wireless power supply device 110 if the state of the power transmission indicates that the power transmission has stopped. Deactivating the electromagnet 102 when the power transmission has stopped or the charging has ended may conserve energy, as alignment of the power-receiving coil 106 and the power-transmitting coil 112 may not be vital while not charging. Repelling the wireless power supply device 110 may facilitate picking up the wireless-chargeable device 100.

Additionally or alternatively, the control circuit 104 may be configured to control the magnetic field strength to decrease the magnetic field strength or to deactivate the electromagnet 102 if the state of the power transmission indicates that the power transmission has been initialized. An initialized power transmission may indicate that the alignment is good enough to perform the power transmission. The state of the power transmission being power transfer may indicate that the power transmission has been initialized. If the state of the power transmission corresponds to discovery (ping) or identification/configuration, the control circuit 104 may be configured to activate the electromagnet to perform or aid the alignment of the power-receiving coil 106 and the power-transmitting coil 112.

The control circuit 104 may be further configured to determine a compatibility of the wireless-chargeable device 100 and the wireless power supply device 110. During the identification/configuration state, the control circuit 104 may be configured to exchange or obtain control or configuration information with/from the wireless power-supply device, which may indicate a wireless power supply standard or wireless power transfer parameters being used. The control circuit 104 may be configured to determine the compatibility based on the received or exchanged information. The control circuit 104 may be configured to control the magnetic field strength based on the determined compatibility of the wireless-chargeable device 100 and the wireless power supply device 110.

For example, the control circuit 104 may be configured to aid the alignment, if the wireless power supply device 110 and the wireless-chargeable device 100 are compatible, and to repel the wireless power-supply device or notify the user if they are not compatible. For example, sounds, vibration or generating a magnetic field in a repelling direction may be used for a perceptible feedback to the user if the RX wireless power standard does not fit to the TX wireless power standard. In case the control circuit 104 detects a transmitter using the wrong standard (e.g. a PMA receiver is placed on a Qi transmitter), the electromagnet may be configured to generate an inverted field. That may prevent the user placing the mobile device on the wireless power supply device and may provide perceptible feedback that something is wrong. The control circuit 104 may be configured to control the magnetic field strength to emit an inverted field to repel the wireless power supply device 110 if the wireless-chargeable device 100 and the wireless power supply device 110 are incompatible, for example. The control circuit 104 may be configured to provide an oscillating current for the electromagnet to generate a sound or vibration, e.g. if the wireless-chargeable device 100 and the wireless power supply device 110 are incompatible. The control circuit 104 may be configured to generate the sound by supplying an oscillating signal in the audible frequency range, e.g. between 20 Hz and 20000 Hz, for example. Repelling the wireless power supply device 110 or providing a sound or vibration may be used to alert a user of the wireless-chargeable device 100 of the incompatibility. The electromagnet may also support releasing the phone from the charger by generating a magnetic field in the opposite direction. This feature may be implemented on the RX (receiving) side only (e.g. transmitters already in the market may be usable).

FIG. 3 shows a wireless-chargeable device 300. The wireless-chargeable device 300 comprises an electromagnet 102 and a control circuit 104. The wireless-chargeable device 300 may be implemented similarly as the wireless-chargeable device 100 of FIG. 1 or a wireless-chargeable device 400 of FIG. 4. The wireless-chargeable device 300 further comprises a power-receiving coil 106. The power-receiving coil 106 may be configured to receive a power for charging the wireless chargeable device induced by an electro-magnetic field generated by the wireless power supply device 100, via induction for example. The power reception may be based on a wireless power transfer protocol, such as Qi or PMA, for example. A resonance frequency of the power-receiving coil 106 may be lower than a resonance frequency of the electromagnet 102, for example. The inductance of the power-receiving coil 106 may be higher than the inductance of a coil of the electromagnet 102 for example, e.g. orders of magnitude higher. A resonance frequency of the power-receiving coil 106 may thus be significantly lower than the resonance frequency of the electromagnet 102. The resonance frequencies being different may lead to reduced losses due to eddy currents.

The control circuit 104 may be configured to monitor at least one electrical parameter of the power-receiving coil 106. The control circuit 104 may be configured to detect a presence of the wireless power supply device 110 in proximity of the wireless-chargeable device 300 based on the at least one electrical parameter. Detecting the presence based on the at least one electrical parameter may enable a detection of the wireless power supply device 110 based on an influence of the wireless power supply device 110 on the power-receiving coil 106. The control circuit 104 may be configured to control the magnetic field strength based on the detected presence, e.g. to commence the alignment when the presence of the wireless power supply device 110 is detected.

The control circuit 104 may be configured to monitor at least one electrical parameter of the group of a voltage, a voltage change, a current, a current change, a resonance frequency and a change in a resonance frequency, for example, to detect the presence, for example. The control circuit 104 may be configured to measure or monitor a voltage or voltage difference across the power-receiving coil 106 for example, to measure the Hall Effect caused by the wireless power supply device 110, for example. Alternatively or additionally, the control circuit 104 may be configured to monitor an electromagnetic inductance across the power-receiving coil 106, e.g. to detect electromagnetic induction caused by the wireless power supply device 110. Alternatively or additionally, the control circuit 104 may be configured to monitor or detect a shift in a resonance frequency of the power-receiving coil 106 caused by the wireless power supply device 110, for example.

More details and aspects of the wireless-chargeable device 300 are mentioned in connection with the proposed concept or one or more examples described above (e.g. FIG. 1 or FIG. 2) or below. The wireless-chargeable device 300 may comprise one or more additional optional features corresponding to one or more aspects of the proposed concept or one or more examples described above or below.

Introducing magnetic material in the center of the inductor may generate losses due to eddy currents. FIG. 2e illustrates such eddy currents. By Lenz's law, an eddy current 240 creates a magnetic field that opposes the magnetic field 242 that created it, and thus eddy currents may react on the source of the magnetic field. As the ferrite core 244 may be conductive, the eddy currents may be short-circuited and may generate resistive losses.

In addition to the eddy current 240, current may be induced into the coil of the electro magnet, which may lead to high voltages if the coil of the electromagnet is not terminated. This coil termination may introduce additional losses.

Eddy current losses in the additional coil of the electromagnet may be avoided by tuning the inductance of the electro magnet coil to a much different (lower) resonance frequency as that of the power transceiver, as a wireless power transfer may be based on using the resonance effect to transfer power with high efficiency. If the resonance frequency of the electromagnet is vastly different from the resonance frequency of the power-receiving coil, the power losses in the electro-magnet coil may be reduced. In at least some examples, there may be a big difference in number of turns between the power receiver coil and the electromagnet coil. This may result in a large difference in the inductance of the two coils. Additionally, a resonance capacitor might be added.

FIG. 2f depicts a plot of simulation results of a PMA system using a 100× higher inductance (L4) in the electromagnet as in the wireless power receiver inductor (L2) and a 10 µF resonance capacitor for L4. The electro-magnet coil is open (OFF). In this example, the rms (root mean square) power loss 250 in the electro-magnet inductor is 2.8 mW compared to a multiple watt output power. The current 252 of L2 and the current 254 of L4 are shown in FIG. 2f.

Losses due to eddy currents in ferrite cores placed in the center of a Qi-power inductor may be in the order of 5% of the transmitted power.

Figure 2G:
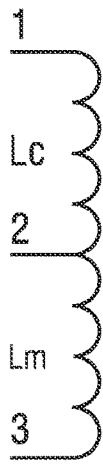
FIG. 2g illustrates a schematic view of a compensation coil.

A compensation coil (which may for example use a portion of the coil of the electro magnet), may allow reducing these losses. For example, the coil (of the electro-magnet) may be split into two coils $L_c$ (first sub-coil) and $L_m$ (second sub-coil). Both coils together (or $L_m$ only) might be used for the electro-magnet, and $L_c$ may be used for eddy current compensation (FIG. 2g).

For the eddy current compensation, the first sub-coil $L_c$ may have a lower inductance as it may be driven with the higher power transfer frequency. A majority of turns of the coil may be in the second part of the coil ($L_m$) to achieve the desired magnetic strength of the electro magnet, for example.

Figure 2H:
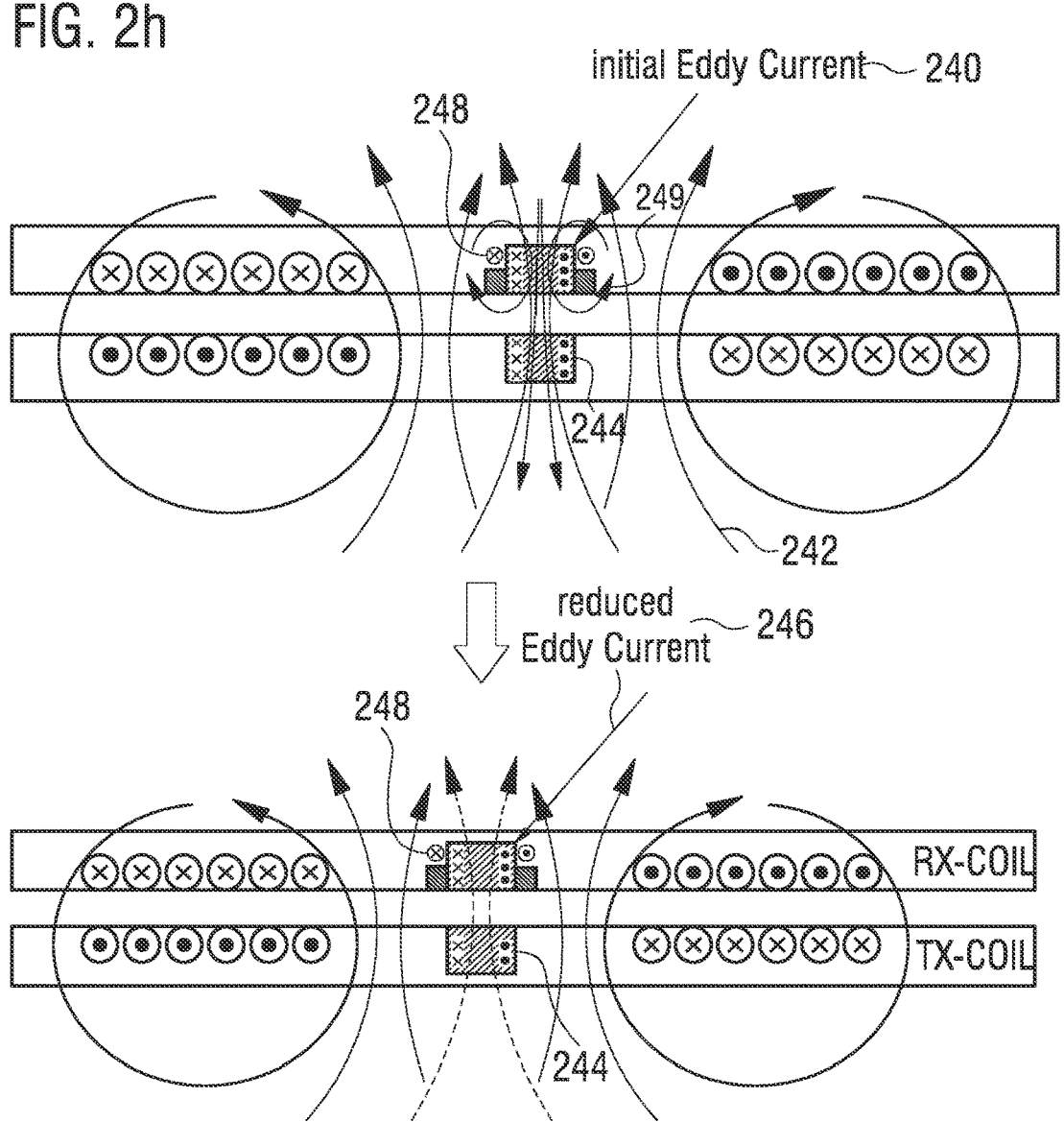
FIG. 2h illustrates an influence of a compensation coil on eddy currents in a ferrite core of an electromagnet during wireless charging.

During power transfer, a current with the same frequency and in phase to the received field may be driven through the compensation coil 248 (e.g. first sub-coil) as shown in FIG. 2h. This current may generate a magnetic field 249 that is opposite to the magnetic field inside the magnetic core 244 of the electro-magnet generated by the power-transmitting coil of the wireless power supply device, and may add to the main field of the power-transmitting coil. The field inside the core 244 may be weakened, the field outside may be strengthened. If the field inside the core is weakened, the eddy currents and related losses may be reduced.

The field in the compensation coil may e.g. be determined by construction (e.g. using the power-receiving coil current with a fixed number of turns) or may be regulated to further decrease power losses.

FIG. 4 shows a wireless-chargeable device 400 according to an example. The wireless-chargeable device 400 comprises an electromagnet 102 and a control circuit 104. The wireless-chargeable device 400 may be implemented similarly as the wireless-chargeable device shown in FIG. 1 or 3. The wireless-chargeable device 400 further comprises a compensation coil 108. The compensation coil 108 may correspond to the compensation coil 260 of FIG. 2g, for example. The compensation coil 108 may be used to reduce eddy currents incurred by the electromagnet 102 for example, and to reduce losses in transferred power caused by the eddy currents. The control circuit 104 may be configured to control a current supply of the compensation coil 108 based on a frequency and/or phase of an induction field received by the power-receiving coil 106. Controlling the current supply of the compensation coil 108 based on the frequency and/or phase of the induction field, e.g. with the same frequency and phase, may generate a magnetic field that is opposite to the field generated by the power-transmitting coil 112 inside the magnetic core of the magnetic field, which may weaken the field inside the core and the strengthen the field outside the core, and reduce eddy currents and related losses.

The control circuit 104 may be further configured to determine the current supply of the compensation coil 108 based on evaluating the quality of the power transmission based on a sweep of power supply parameters, e.g. to determine, for which parameters the quality of the power transmission is increased or losses are reduced.

A portion the coil of the electromagnet 102 may represent the compensation coil 108, for example. The coil of the electromagnet 102 may comprise an intermediate tap dividing the coil of the electromagnet 102 into two sub-coils. Alternatively, the coil of the electromagnet and the compensation coil 108 may be separate coils as shown in FIG. 4. An inductance of the compensation coil 108 may be lower than an inductance of the coil of the electromagnet 102, as it may be driven with the higher power transfer frequency (the resonance frequency of the power-receiving coil 106 for example).

More details and aspects of the wireless-chargeable device 400 are mentioned in connection with the proposed concept or one or more examples described above (e.g. FIG. 1 to FIG. 3) or below. The wireless-chargeable device 400 may comprise one or more additional optional features corresponding to one or more aspects of the proposed concept or one or more examples described above or below.

Figure 5:
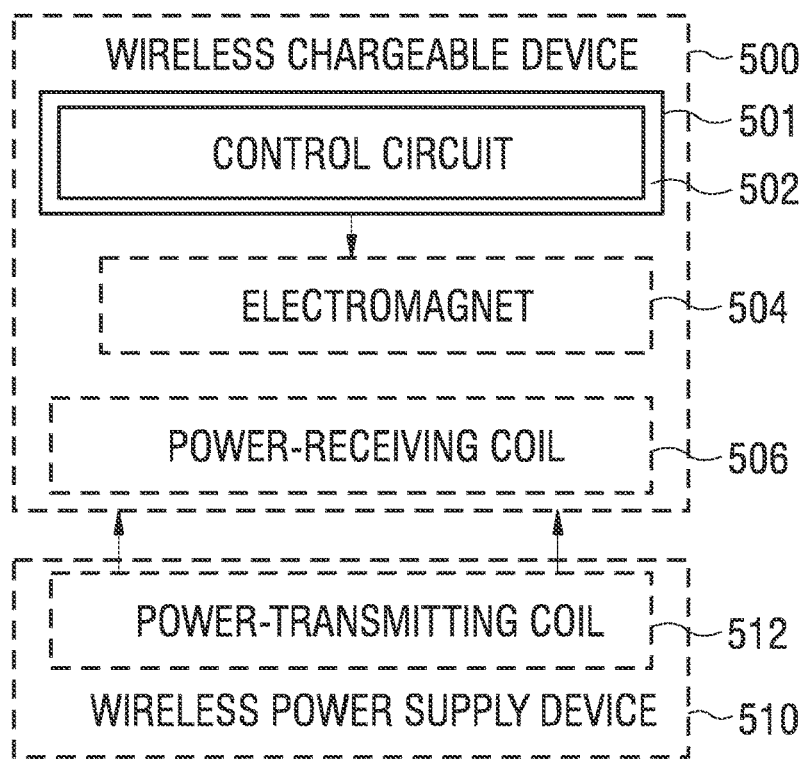
FIG. 5 shows a block diagram of an apparatus for controlling wireless charging of a wireless-chargeable device.

FIG. 5 shows an apparatus 501 for controlling wireless charging of a wireless-chargeable device 500. The apparatus 501 comprises a control circuit 502 configured to control a magnetic field strength generated by an electromagnet 504 for alignment of a power-receiving coil 506 of a wireless-chargeable device 500 with respect to a power-transmitting coil 512 of the wireless power supply device 510. In examples, the control circuit 502 may be implemented similarly to the control circuit 104 of one of one of the examples shown by FIGS. 1-3. The wireless-chargeable device 500 may be implemented similarly to one of the wireless-chargeable device shown by FIG. 1, 3 or 4. The apparatus 501 may further comprise the electromagnet 504, for example. The apparatus 501 may further comprise the power-receiving coil 506, for example. The apparatus 501 may further comprise a compensation coil, for example. The compensation coil may be implemented similarly to the compensation coil 108 shown by FIG. 4, for example.

The apparatus 501 may further comprise an interface. The control circuit 502 may be configured to provide a control signal via the interface 502 to control the magnetic field strength. The apparatus 501 may further comprise an adjustable power supply for the electromagnet. The control circuit 502 may be configured to control the adjustable power supply to control the magnetic field strength.

More details and aspects of the apparatus 501 are mentioned in connection with the proposed concept or one or more examples described above (e.g. FIGS. 1 to 4) or below. The apparatus 501 may comprise one or more additional optional features corresponding to one or more aspects of the proposed concept or one or more examples described above or below.

Some examples relate to a mobile device (e.g. a cell phone) being a wireless-chargeable device according to an example described above or below and/or comprising an apparatus for controlling wireless charging of a wireless-chargeable device according to an example described above or below.

Figure 6:
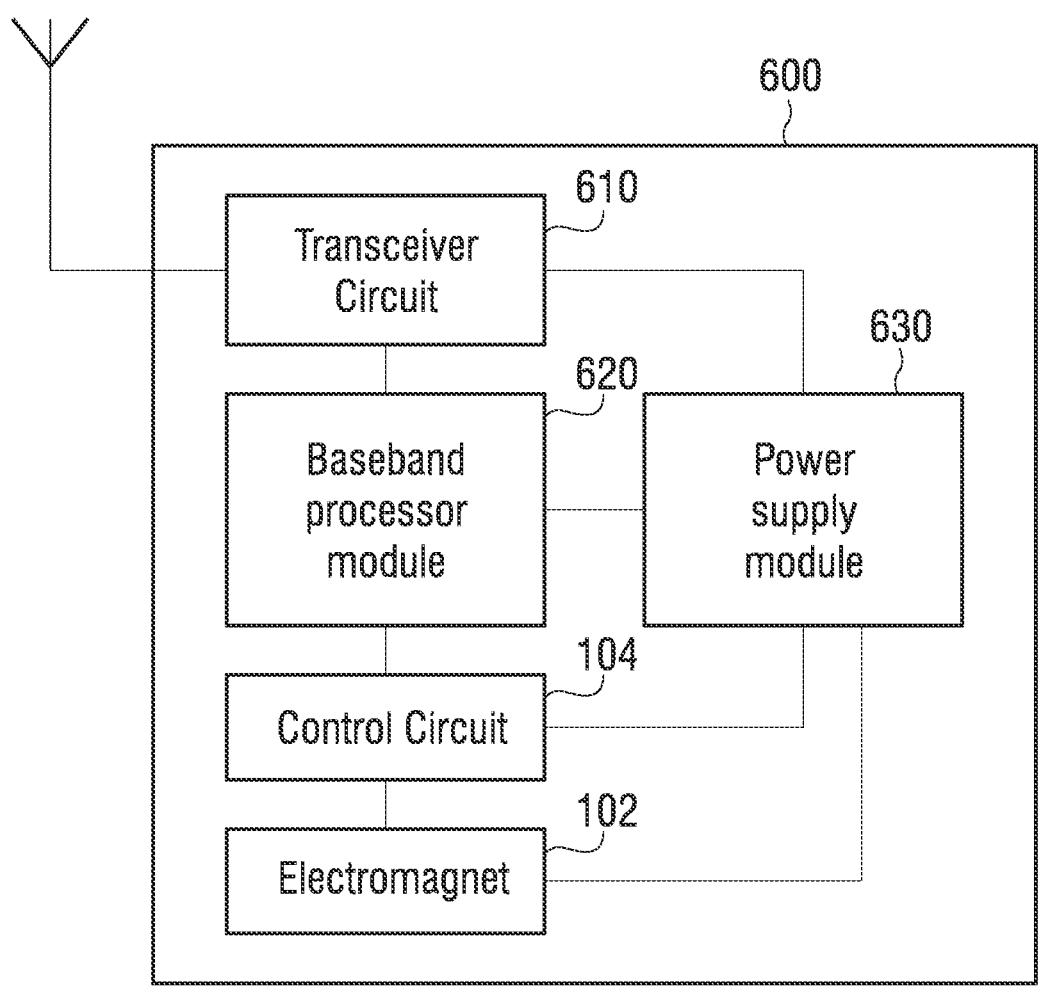
FIG. 6 shows a schematic illustration of a mobile device.

FIG. 6 shows a schematic illustration of a cell phone 600 according to an example. The cell phone 600 comprises a transceiver circuit 610, a baseband processor module 620 for generating at least the digital (e.g. baseband) signal to be transmitted by the transceiver circuit 610 and/or processing a baseband signal. Additionally, the mobile device 600 comprises a power supply unit 630 supplying at least the transmitter 610 and the baseband processor module 620 with power. Further, the cell phone 600 comprises an electromagnet 102 and a control circuit 104 as mentioned in connection with one or more examples described above or below. The control circuit 104 may be a hardware module connected to the baseband processor module 620 or part of the baseband processor module 620 or a software running on the baseband processor module 620, for example.

More details and aspects of cell phone 600 are mentioned in connection with the proposed concept or one or more examples described above (e.g. FIGS. 1 to 4) or below. The cell phone 600 may comprise one or more additional optional features corresponding to one or more aspects of the proposed concept or one or more examples described above or below.

Various examples may relate to devices (e.g. cell phone, base station, mobile device), which may be wirelessly chargeable, or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In these examples, the mobile communication system may comprise mobile transceivers, relay station transceivers and base station transceivers. The relay station transceivers and base station transceivers can be composed of one or more central units and one or more remote units.

A mobile transceiver or mobile device, which may be wirelessly chargeable, may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

Figure 7:
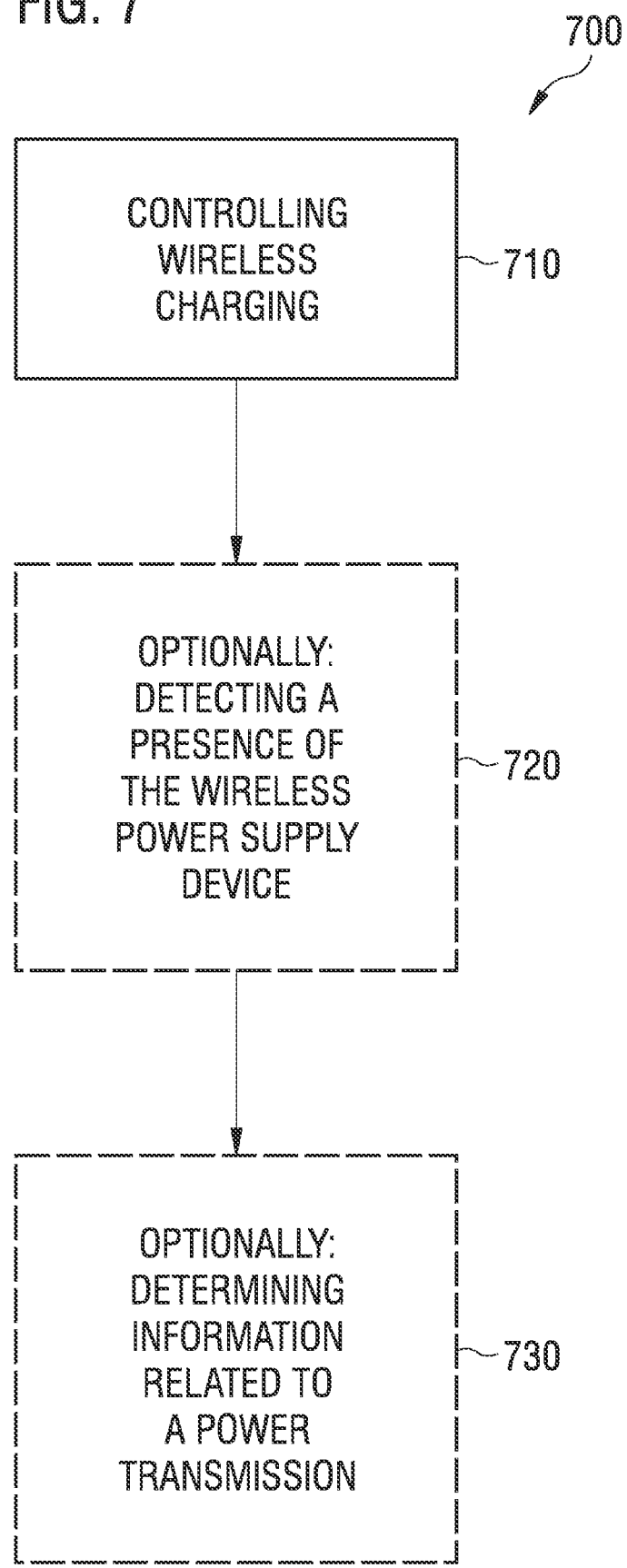
FIG. 7 shows a flow chart of a method for controlling wireless charging of a wireless-chargeable device.

FIG. 7 shows a flow chart of a method 700 for controlling wireless charging of a wireless-chargeable device. The method 700 comprises controlling 710 a magnetic field strength generated by an electromagnet for alignment of a power-receiving coil of a wireless-chargeable device with respect to a power-transmitting coil of a wireless power supply device.

Controlling the magnetic field strength may enable aligning or aiding alignment of the wireless-chargeable device 100 and the wireless power supply device 110 by using magnetic attraction, while avoiding or reducing possible damage to external devices or materials.

Optionally, the method 700 further comprises detecting 720 a presence of the wireless power supply device in proximity of the wireless-chargeable device, wherein the magnetic field strength is controlled based on the detected presence.

Optionally, the method 700 further comprises determining 730 information related to a power transmission between the wireless power supply device and the wireless-chargeable device, and wherein the magnetic field strength is controlled based on the information related to the power transmission.

In the following, examples pertain to further examples. Example 1 is a wireless-chargeable device comprising an electromagnet and a control circuit configured to control a magnetic field strength generated by the electromagnet for alignment of a power-receiving coil of the wireless-chargeable device with respect to a power-transmitting coil of a wireless power supply device.

In example 2, the subject matter of example 1 can optionally include the control circuit being configured to detect a presence of the wireless power supply device in proximity of the wireless-chargeable device and the control circuit being configured to control the magnetic field strength based on the detected presence.

In example 3, the subject matter of example 2 can optionally include the control circuit being configured to increase the magnetic field strength or to activate the electromagnet based on the detected presence.

In example 4, the subject matter of one of the examples 1-3 can optionally include the control circuit being configured to determine information related to a power transmission between the wireless power supply device and the wireless-chargeable device, and the control circuit being configured to control the magnetic field strength based on the information related to the power transmission.

In example 5, the subject matter of example 4 can optionally include the control circuit being configured to monitor the power transmission between the wireless power supply device and the wireless-chargeable device to obtain the information related to the power transmission.

In example 6, the subject matter of one of the examples 4-5 can optionally include the control circuit being configured to determine a quality of the power transmission based on the information related to the power transmission and the control circuit being configured to control the magnetic field strength based on the quality of the power transmission.

In example 7, the subject matter of example 6 can optionally include the control circuit being configured to increase the magnetic field strength or to activate the electromagnet if the quality of the power transmission is below a lower threshold.

In example 8, the subject matter of one of the examples 6-7 can optionally include the control circuit being configured to decrease the magnetic field strength or to deactivate the electromagnet if the quality of the power transmission is above an upper threshold.

In example 9, the subject matter of one of the examples 4-8 can optionally include the control circuit being configured to detect a state of the power transmission based on the information related to the power transmission and the control circuit being configured to control the magnetic field strength based on the state of the power transmission.

In example 10, the subject matter of example 9 can optionally include the control circuit being configured to decrease the magnetic field strength, to deactivate the electromagnet or to control the magnetic field strength to emit an inverted field to repel the wireless power supply device if the state of the power transmission indicates that the power transmission has stopped.

In example 11, the subject matter of one of the examples 9-10 can optionally include the control circuit being configured to control the magnetic field strength to decrease the magnetic field strength or to deactivate the electromagnet if the state of the power transmission indicates that the power transmission has been initialized.

In example 12, the subject matter of one of the examples 1-11 can optionally include the control circuit being configured to determine a compatibility information of the wireless-chargeable device and the wireless power supply device and the control circuit being configured to control the magnetic field strength based on the determined compatibility of the wireless-chargeable device and the wireless power supply device.

In example 13, the subject matter of example 12 can optionally include the control circuit being configured to control the magnetic field strength to emit an inverted field to repel the wireless power supply device if the determined compatibility information indicates that the wireless-chargeable device and the wireless power supply device are incompatible.

In example 14, the subject matter of one of the examples 1-13 can optionally include the control circuit being configured to provide an oscillating current for the electromagnet to generate a sound or vibration if the wireless-chargeable device and the wireless power supply device are incompatible.

In example 15, the subject matter of example 14 can optionally include the control circuit being configured to determine a compatibility of the wireless-chargeable device and the wireless power supply device and the control circuit being configured to provide the oscillating current if the wireless-chargeable device and the wireless power supply device are incompatible.

In example 16, the subject matter of one of the examples 1-15 can optionally comprise the power-receiving coil, wherein the power-receiving coil is optionally configured to receive a power for charging the wireless chargeable device induced by an electro-magnetic field generated by the wireless power supply device.

In example 17, the subject matter of example 16 can optionally include the control circuit being configured to monitor at least one electrical parameter of the power-receiving coil and the control circuit being configured to detect a presence of the wireless power supply device in a proximity of the wireless-chargeable device based on the at least one electrical parameter.

In example 18, the subject matter of example 17 can optionally include the c at least one electrical parameter of the power-receiving coil being one of the group of a voltage, a voltage change, a current, a current change, a resonance frequency and a change in a resonance frequency.

In example 19, the subject matter of one of the examples 17-18 can optionally include the control circuit being configured to control the magnetic field strength based on the detected presence.

In example 20, the subject matter of one of the examples 15-19 can optionally include a resonance frequency of the power-receiving coil being lower than a resonance frequency of the electromagnet.

In example 21, the subject matter of one of the examples 1-20 can optionally include the electro-magnet comprising a coil, wherein an inner diameter of the coil of the electromagnet can optionally measure between 5 mm and 15 mm and wherein an outer diameter of the coil of the electromagnet can optionally measure between 10 mm and 25 mm.

In example 22, the subject matter of one of the examples 1-21 can optionally comprise a compensation coil, wherein the control circuit is optionally configured to control a current supply of the compensation coil based on at least a frequency and phase of an induction field received by the power-receiving coil.

In example 23, the subject matter of example 22 can optionally include the electro-magnet comprising a coil, wherein an inductance of the compensation coil can optionally be lower than an inductance of the coil of the electromagnet.

In example 24, the subject matter of example 23 can optionally include the electro-magnet comprising a coil, wherein a portion the coil of the electromagnet can optionally represent the compensation coil.

In example 25, the subject matter of one of the examples 1-24 can optionally include the electro-magnet comprising a ferromagnetic core.

Example 26 is an apparatus for controlling wireless charging of a wireless-chargeable device, wherein the apparatus comprises a control circuit configured to control a magnetic field strength generated by an electromagnet for alignment of a power-receiving coil of a wireless-chargeable device with respect to a power-transmitting coil of a wireless power supply device.

In example 27, the subject matter of example 26 can optionally include the control circuit being configured to detect a presence of the wireless power supply device in a proximity of the wireless-chargeable device and the control circuit being configured to control the magnetic field strength based on the detected presence.

In example 28, the subject matter of example 27 can optionally include the control circuit being configured to increase the magnetic field strength or to activate the electromagnet based on the detected presence.

In example 29, the subject matter of one of the examples 26-28 can optionally include the control circuit being configured to determine information related to a power transmission between the wireless power supply device and the wireless-chargeable device and the control circuit being configured to control the magnetic field strength based on the information related to the power transmission.

In example 30, the subject matter of example 29 can optionally include the control circuit being configured to detect a state of the power transmission based on the information related to the power transmission and the control circuit being configured to control the magnetic field strength based on the state of the power transmission.

In example 31, the subject matter of one of the examples 26-30 can optionally include the control circuit being configured to determine a compatibility of the wireless-chargeable device and the wireless power supply device and the control circuit being configured to control the magnetic field strength based on the determined compatibility of the wireless-chargeable device and the wireless power supply device.

In example 32, the subject matter of one of the examples 26-31 can optionally include the control circuit being configured to monitor at least one electrical parameter of the power-receiving coil and the control circuit being configured to detect a presence of the wireless power supply device in a proximity of the wireless-chargeable device based on the at least one electrical parameter.

In example 33, the subject matter of one of the examples 26-32 can optionally include the apparatus further comprising the power-receiving coil, wherein the power-receiving coil is configured to receive a power for charging the wireless chargeable device induced by an electro-magnetic field generated by the wireless power supply device.

Example 34 is a mobile device comprising an apparatus according to one of the examples 26-33.

Example 35 is a cell phone comprising an apparatus according to one of the examples 26-33.

Example 36 is a method for controlling wireless charging of a wireless-chargeable device, wherein the method comprises controlling a magnetic field strength generated by an electromagnet for alignment of a power-receiving coil of a wireless-chargeable device with respect to a power-transmitting coil of a wireless power supply device.

In example 37, the subject matter of example 36 can optionally include detecting a presence of the wireless power supply device in proximity of the wireless-chargeable device, wherein the magnetic field strength is controlled based on the detected presence.

In example 38, the subject matter of one of the examples 36-37 can optionally include the magnetic field strength being controlled by increasing the magnetic field strength or activating the electromagnet based on the detected presence.

In example 39, the subject matter of one of the examples 36-38 can optionally include determining information related to a power transmission between the wireless power supply device and the wireless-chargeable device, and the magnetic field strength being controlled based on the information related to the power transmission.

In example 40, the subject matter of example 39 can optionally include information related to a power transmission being determined by monitoring the power transmission between the wireless power supply device and the wireless-chargeable device.

In example 41, the subject matter of one of the examples 39-40 can optionally include determining a state of the power transmission based on the information related to the power transmission and the magnetic field strength being controlled based on the determined state of the power transmission.

In example 42, the subject matter of one of the examples 36-41 can optionally include providing an oscillating current for the electromagnet to generate a sound or vibration.

In example 43, the subject matter of one of the examples 36-42 can optionally include controlling a current supply of a compensation coil of the wireless-chargeable device based on at least one of a frequency and phase of an induction field received by the power-receiving coil.

Example 44 is a machine readable storage medium including program code, when executed, to cause a machine to perform the method of one of the examples 36 to 42.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for something". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. A wireless-chargeable device comprising:
an electromagnet; and
a control circuit configured to:
control a magnetic field strength generated by the electromagnet for alignment of a power-receiving coil of the wireless-chargeable device with respect to a power-transmitting coil of a wireless power supply device,
determine a compatibility information related to the wireless power supply device and the wireless-chargeable device,
control the magnetic field strength based on the determined compatibility information related to the wireless power supply device and the wireless-chargeable device, and
control the magnetic field strength to generate a magnetic field that is in the opposite direction of the magnetic field of the wireless power supply device to repel the wireless power supply device if the determined compatibility information indicates that wireless power supply device and the wireless-chargeable device are incompatible.

2. The wireless-chargeable device according to claim 1, wherein the control circuit is configured to detect a presence of the wireless power supply device in proximity of the wireless-chargeable device, and wherein the control circuit is configured to control the magnetic field strength based on the detected presence.

3. The wireless-chargeable device according to claim 2, wherein the control circuit is configured to increase the magnetic field strength or to activate the electromagnet based on the detected presence.

4. The wireless-chargeable device according to claim 1, wherein the control circuit is configured to determine information related to a power transmission between the wireless power supply device and the wireless-chargeable device, and wherein the control circuit is configured to control the magnetic field strength based on the information related to the power transmission.

5. The wireless-chargeable device according to claim 4, wherein the control circuit is configured to monitor the power transmission between the wireless power supply device and the wireless-chargeable device to obtain the information related to the power transmission.

6. The wireless-chargeable device according to claim 4, wherein the control circuit is configured to determine a quality of the power transmission based on the information related to the power transmission, and wherein the control circuit is configured to control the magnetic field strength based on the quality of the power transmission.

7. The wireless-chargeable device according to claim 6, wherein the control circuit is configured to increase the magnetic field strength or to activate the electromagnet if the quality of the power transmission is below a lower threshold.

8. The wireless-chargeable device according to claim 6, wherein the control circuit is configured to decrease the magnetic field strength or to deactivate the electromagnet if the quality of the power transmission is above an upper threshold.

9. The wireless-chargeable device according to claim 4, wherein the control circuit is configured to detect a state of the power transmission based on the information related to the power transmission, and wherein the control circuit is configured to control the magnetic field strength based on the state of the power transmission.

10. The wireless-chargeable device according to claim 9, wherein the control circuit is configured to decrease the magnetic field strength, to deactivate the electromagnet, or to control the magnetic field strength to generate a magnetic field that is in the opposite direction of the magnetic field of the wireless power supply device to repel the wireless power supply device if the state of the power transmission indicates that the power transmission has stopped.

11. The wireless-chargeable device according to claim 9, wherein the control circuit is configured to control the magnetic field strength to decrease the magnetic field strength or to deactivate the electromagnet if the state of the power transmission indicates that the power transmission has been initialized.

12. The wireless-chargeable device according to claim 1, wherein the control circuit is configured to provide an oscillating current for the electromagnet to generate a sound or vibration.

13. The wireless-chargeable device according to claim 12, wherein the control circuit is further configured to determine a compatibility information of the wireless-chargeable device and the wireless power supply device, wherein the control circuit is configured to provide the oscillating current, if the determined compatibility information indicates that the wireless-chargeable device and the wireless power supply device are incompatible.

14. The wireless-chargeable device according to claim 1, further comprising the power-receiving coil, wherein the power-receiving coil is configured to receive a power for charging the wireless chargeable device induced by an electro-magnetic field generated by the wireless power supply device.

15. The wireless-chargeable device according to claim 13, wherein the control circuit is configured to monitor at least one electrical parameter of the power-receiving coil, wherein the control circuit is configured to detect a presence of a wireless power supply device in a proximity of the wireless-chargeable device based on the at least one electrical parameter.

16. The wireless-chargeable device according to claim 15, wherein the least one electrical parameter of the power-receiving coil is one of the group of a voltage, a voltage change, a current, a current change, a resonance frequency and a change in a resonance frequency.

17. The wireless-chargeable device according to claim 15, wherein the control circuit is configured to control the magnetic field strength based on the detected presence.

18. The wireless-chargeable device according to claim 13, wherein a resonance frequency of the power-receiving coil is lower than a resonance frequency of the electromagnet.

19. An apparatus for controlling wireless charging of a wireless-chargeable device, wherein the apparatus comprises:
- a control circuit configured to control a magnetic field strength generated by an electromagnet of the wireless-chargeable device for alignment of a power-receiving coil of a wireless-chargeable device with respect to a power-transmitting coil of a wireless power supply device,
- wherein the control circuit is configured:
  - to determine a compatibility information of the wireless-chargeable device and the wireless power supply device,
  - to control the magnetic field strength based on the determined compatibility of the wireless-chargeable device and the wireless power supply device, and
  - to control the magnetic field strength to generate a magnetic field that is in the opposite direction of the magnetic field of the wireless power supply device to repel the wireless power supply device, if the determined compatibility information indicates that the wireless-chargeable device and the wireless power supply device are incompatible.

20. A method for controlling wireless charging of a wireless-chargeable device, wherein the method comprises:
- controlling a magnetic field strength generated by an electromagnet of the wireless-chargeable device for alignment of a power-receiving coil of a wireless-chargeable device with respect to a power-transmitting coil of a wireless power supply device, determining a compatibility information of the wireless-chargeable device and the wireless power supply device,
- controlling the magnetic field strength based on the determined compatibility of the wireless-chargeable device and the wireless power supply device, and
- controlling the magnetic field strength to generate a magnetic field that is in the opposite direction of the magnetic field of the wireless power supply device to repel the wireless power supply device, if the determined compatibility information indicates that the wireless-chargeable device and the wireless power supply device are incompatible.

21. A non-transitory machine readable storage medium including program code, when executed, to cause a machine to perform the method of claim 20.

* * * * *